United States Patent [19]
Weatherbee et al.

[11] Patent Number: 6,000,203
[45] Date of Patent: Dec. 14, 1999

[54] BLUEBERRY HARVESTER

[76] Inventors: Lloyd H. Weatherbee; Brian Weatherbee, both of 234 Madison Road, R. R. #1, Charlottetown, Prince Edward Island, Canada, C1A 7J6

[21] Appl. No.: 09/037,277

[22] Filed: Mar. 9, 1998

[51] Int. Cl.⁶ ..................................................... A01D 46/20
[52] U.S. Cl. .............................. 56/14.9; 56/330; 56/15.6; 56/329
[58] Field of Search ..................... 56/14.9, 15.6, 56/328.1, 329, 330, 331

[56] References Cited

U.S. PATENT DOCUMENTS

| | | | |
|---|---|---|---|
| 924,552 | 6/1909 | Holmes | 56/330 |
| 1,360,473 | 11/1920 | Turner et al. | 56/330 |
| 2,376,260 | 5/1945 | Lobdell . | |
| 2,696,706 | 12/1954 | Getsinger . | |
| 2,783,605 | 3/1957 | Heleen . | |
| 2,795,099 | 6/1957 | Getsinger . | |
| 3,460,332 | 8/1969 | Buchele et al. | 56/330 |
| 3,616,630 | 11/1971 | Gray . | |
| 3,648,447 | 3/1972 | Burton . | |
| 3,675,406 | 7/1972 | Grant et al. . | |
| 3,828,534 | 8/1974 | McRobert | 56/328.1 |
| 4,141,204 | 2/1979 | Kuryluk . | |
| 4,862,683 | 9/1989 | Bragg et al. | 56/330 |
| 5,369,944 | 12/1994 | Robichaud . | |
| 5,375,403 | 12/1994 | Collins . | |
| 5,450,716 | 9/1995 | Gidge . | |

FOREIGN PATENT DOCUMENTS

| | | |
|---|---|---|
| 523354 | 9/1954 | Canada . |
| 948858 | 6/1974 | Canada . |
| 961275 | 1/1975 | Canada . |
| 1249727 | 2/1989 | Canada . |
| 1318135 | 5/1993 | Canada . |

*Primary Examiner*—H. Shakelford
*Attorney, Agent, or Firm*—Mario D. Theriault

[57] ABSTRACT

A blueberry harvester comprising a platform mountable behind an agricultural tractor. The platform has a post near the harvesting side thereof with a jib-boom crane mounted on that post. There is also provided a blueberry picking head having riggings connected to the jib-boom crane and a pair of conveyors connected to the picking head for conveying the blueberries withdrawn from blueberry plants, from the picking head to a region over the platform. A hinged frame is pivotally mounted on the post, and connected to the conveyors for supporting the conveyors. The hinged frame with the conveyors supported thereon are movable from a harvesting position alongside the harvesting side of the tractor to a stowed position over the platform near the harvesting side. The jib-boom crane is movable with the picking head suspended thereto from a position along the harvesting side of the tractor, to a space over the platform between the stowed position of the conveyors and the harvested side of the platform. The blueberry harvester of the present invention is thereby safely transportable on public roads from one field of blueberries to another. Other aspects of the blueberry harvester of the present invention comprise human-like movements of the tines during the fruit withdrawing motions, and an extensive contact of the picking trays with a rotary brush inside the picking head for effectively cleaning the trays between each fruit withdrawing passes.

20 Claims, 8 Drawing Sheets

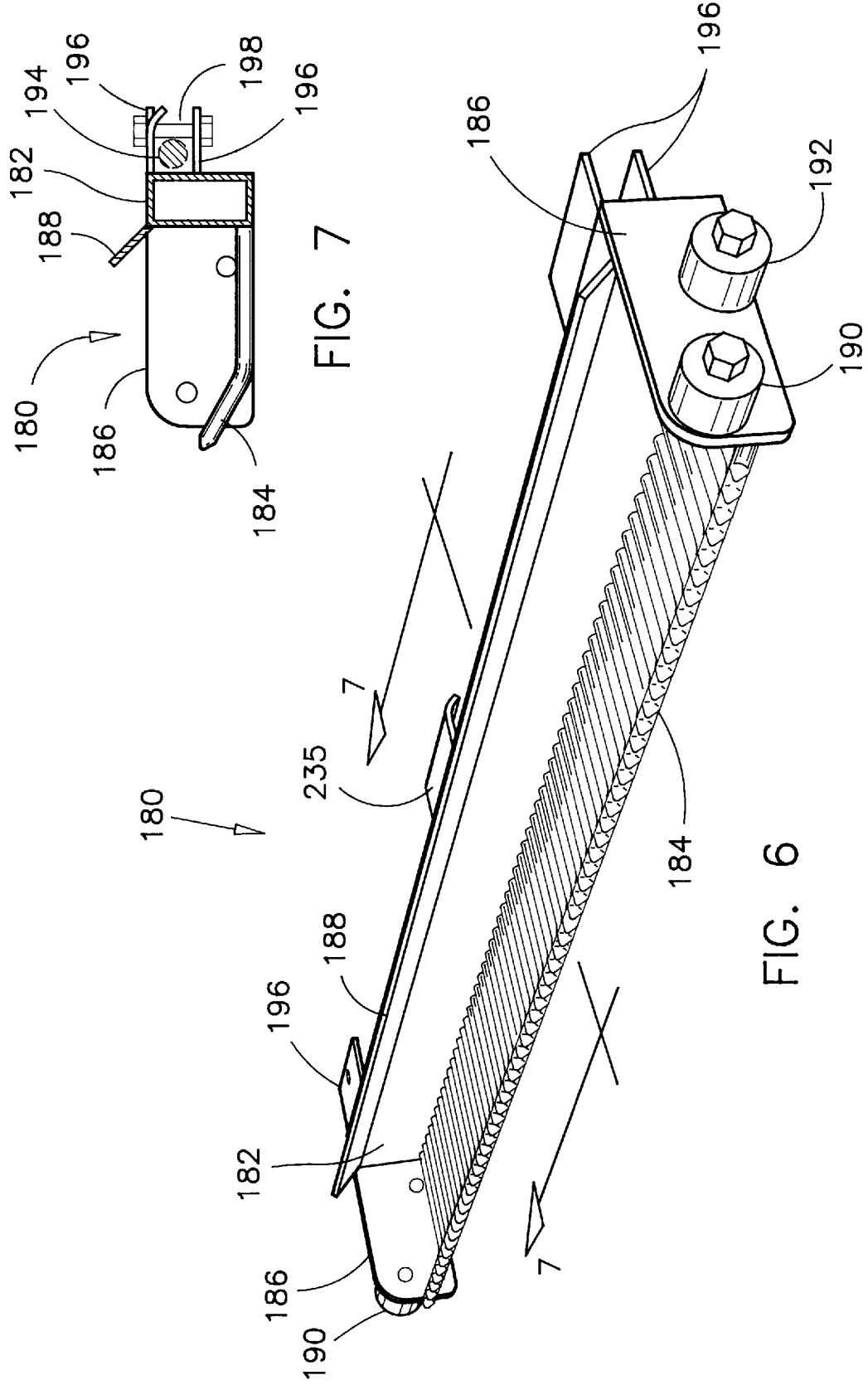

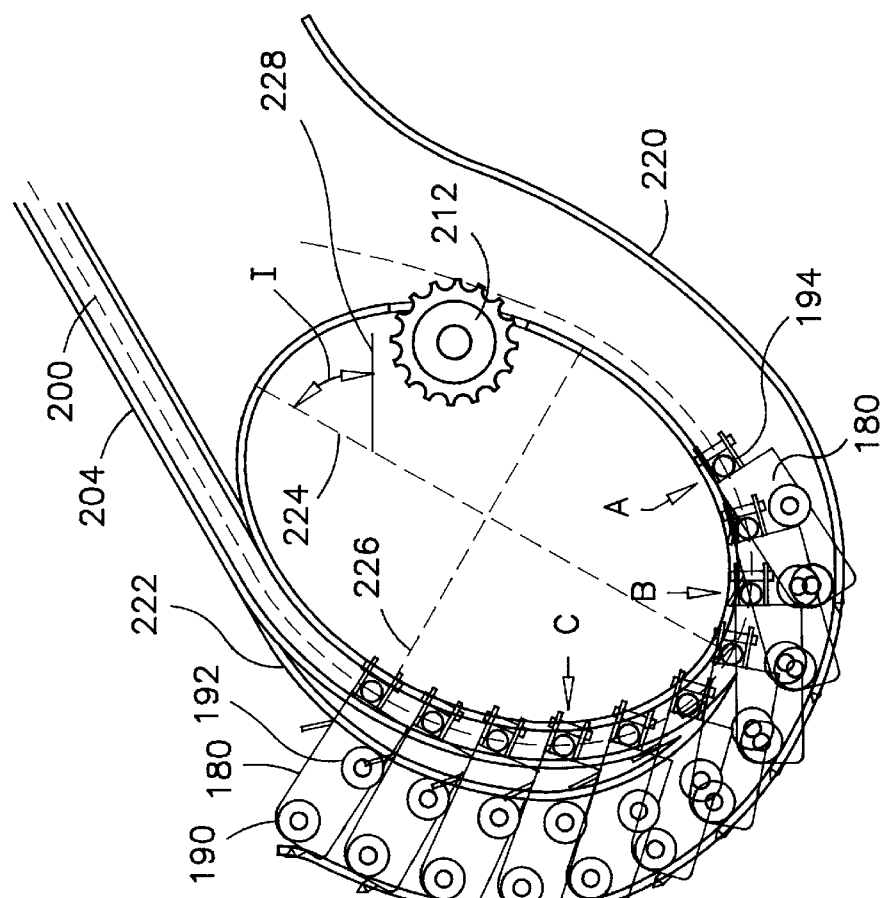
FIG. 9
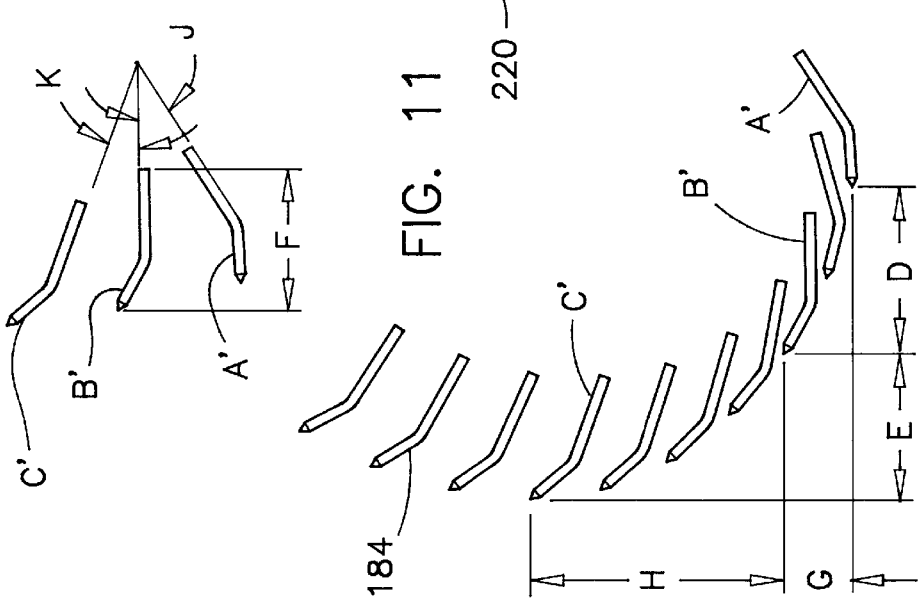
FIG. 10
FIG. 11

BLUEBERRY HARVESTER

FIELD OF THE INVENTION

The present invention relates to apparatus for harvesting blueberries and more specifically it relates to an apparatus which is attachable to an agricultural tractor for harvesting blueberries in commercial quantities.

BACKGROUND OF THE INVENTION

Harvesting of blueberries is usually done from mid-August to early September, depending upon the location of the field and the weather conditions at that time. Typical growers may harvest fields ranging in size from 25 acres to 250 acres. Therefore, the harvesting of these fields must sometimes be done within a 2–3 weeks period.

When the cropland is relatively large, the harvesting task is too tedious to be done manually, or to be done by workers using manual implements. Therefore, there is a significant demand for self-propelled, efficient mechanical harvesters. A number of self-propelled apparatus for harvesting blueberries is available commercially. These machines, however, are not all very efficient, and in general, each type has inherent operational limitations.

One type of machine of the prior art is described in Canadian Patent no. 523,354 to L. C. Getsinger, April 1956. The machine has a drum, and a number of combs spaced apart at regular angular intervals and across the surface of the drum. The drum rotates against the direction of the travel of the machine such that the fingers of the combs intersect with berry plants and rake the fruits from these plants.

The combs are arranged to follow a cam groove so that the fingers withdraw within the surface of the drum at predetermined locations on the circumference of their course to facilitate the release of fruits onto a slide and into an exit conveyor.

Other similar self-propelled machines using articulated fingers mounted on a drum or along a chain moving against the direction of travel of the apparatus are described in the following documents:

Canadian Patent: 948,858 to G. L. Gray, June 1974;
Canadian Patent: 961,275 to C. G. Burton, January 1975;
U.S. Pat. No. 2,376,260 to A. M. Lobdell, May, 1945;
U.S. Pat. No. 2,696,706 to L. C. Getsinger, December 1954;
U.S. Pat. No. 2,783,605 to E. O. Heleen, March 1957;
U.S. Pat. No. 2,795,099 to L. C. Getsinger, June 1957;
U.S. Pat. No. 3,616,630 to G. L. Gray et al. November 1971;
U.S. Pat. No. 3,648,447 to C. G. Burton, March 1972;
U.S. Pat. No. 3,675,406 to Grant et al., July 1972;
U.S. Pat. No. 4,141,204 to M. H. Kuryluk, February 1979.
U.S. Pat. No. 5,369,944 to O. Robichaud, December 1994;
U.S. Pat. No. 5,450,716 to L. Gidge, September 1995;

Another type of blueberry harvesting machinery available commercially is adapted to be mounted on a farm tractor, and is popular amongst Eastern Canada blueberry growers. The main characteristic of this machine is that the tines are mounted on a hollow drum and are adapted to discharge berries onto a conveyor mounted in the center of the drum. This machine is described in Canadian Patents no. 1,249,727 and 1,318,135, both to joint inventors D. R. Bragg and L. H. Weatherbee, and are dated February 1989 and May 1993 respectively. Another invention relating to this latter type of machine is disclosed in U.S. Pat. No. 5,375,403 to Collins et al., December 1994.

The apparatus of the prior art are known to have several limitations disfavouring their acceptance by commercial growers. For examples, the mechanisms to withdraw the tines inside the drum and to convey berries are mechanically complex, and therefore the purchase cost of one of these machines is sometimes considered prohibitive by small and medium size growers. The efficiency of these machines is often curtailed by the clogging of the fingers in each comb with leaves, twigs and squashed berries. The installation of the machines on a farm tractor is intensive work which is better done by the harvester's manufacturer himself. The installation of the machines on a farm tractor is more or less a permanent installation wherein the farm tractor is unavailable for doing other work during the blueberry harvest period. And finally, the gatherings of these machines are known to contain much leaves and debris. All these factors have contributed to the development of a market demand for better harvesting apparatus.

SUMMARY OF THE INVENTION

In accordance with one aspect of the present invention, the blueberry harvester comprises a platform mountable behind an agricultural tractor. The platform has a front edge, a rear edge, a harvesting side, a harvested side and a nominal surface area. The front edge has a front framing member extending longitudinally and upwardly therefrom and has a post near the harvesting side of the platform with a jib-boom crane mounted on that post. The blueberry harvester of the present invention also comprises a blueberry picking head having means for withdrawing blueberries from blueberry plants, and rigging means connected between the picking head and the jib-boom crane. There is also provided a pair of conveyors connected to the picking head for conveying the blueberries withdrawn from blueberry plants, from the picking head to a region over the platform. The blueberry harvester further has a hinged frame pivotally mounted on the post. The hinged frame is connected to the pair of conveyors for supporting the pair of conveyors. The combined ground projections of the picking head and the pair of conveyors are less than the nominal area of the platform.

The hinged frame with the pair of conveyors supported thereon are movable over an angular displacement of about 180°, from a harvesting position alongside the harvesting side of the platform, to a stowed position over the platform near the harvesting side. The jib-boom crane is movable with the picking head suspended thereto from a first position along the harvesting side of the tractor, to a space over the platform between the stowed position of the pair of conveyors and the harvested side.

The components of the blueberry harvester of the present invention are easily manipulated from a harvesting position alongside the tractor to a stowed, roadworthy position on the platform. The blueberry harvester of the present invention is thereby safely carried on public roads from one field of blueberries to another. A harvesting arrangement is also easily recoverable by similarly manipulating the components off the platform when the tractor reaches the next field to be harvested.

In accordance with another aspect of the present invention the blueberry picking head comprises a frame having a forward low end, a rear high end, a pair of spaced apart side plates having each an inside side. The frame is movable over a crop in a direction before the forward low end. The blueberry picking head also comprises a pair of chain-guiding circuits each being mounted on a respective inside side of each of the side plates. Each chain-guiding circuit comprises a forward segment, an uprising segment connected to the forward segment, a return segment, a first transitional segment connected to the uprising segment and to the return segment and a second transitional segment connected to the return segment and to the forward segment. The blueberry picking head also has a pair of roller chains movably mounted in the chain-guiding circuits, and a drive motor connected to the pair of roller chains for moving the roller chains along the chain-guiding circuits. There is also provided a plurality of elongated blueberry picking trays mounted between the roller chains at regular intervals therealong with each tray being aligned perpendicularly to a direction of travel of the picking head. The forward segments of the chain-guiding circuits are configured for moving the trays along a plant entering motion and a plant stripping motion wherein the horizontal component of the plant entering motion is greater than the vertical component of that plant entering motion, and the vertical component of the plant stripping motion is greater than the horizontal component of the plant stripping motion.

The aforesaid movements of the trays are similar to the movements performed by an experienced blueberry picker manipulating a manual blueberry picking implement. These movements produce minimum damage to the fruits and to the blueberry plants.

In accordance with a third aspect of the present invention, the blueberry picking head further comprises a rotary brush mounted along the second intermediate segment of the chain-guiding circuit for cleaning the tines of the trays before the trays move along the forward segment of the chain-guiding segments. The return segment, the second intermediate segment and the forward segment define jointly an arc of about one hundred and thirty degrees (130°) around the rotary brush whereby the tines of the trays are thoroughly cleaned before moving into a plant entering position.

BRIEF DESCRIPTION OF THE DRAWINGS

Other advantages of the invention will be apparent from the following description of the preferred embodiment illustrated in the accompanying drawings, in which:

FIG. 6 is a perspective front, left side and top view of a blueberry picking tray;

FIG. 7 is a cross-section view of the picking tray along line 7—7 in FIG. 6.

FIG. 9 is an enlarged view of the elliptical chain-guiding track inside the picking head;

FIG. 10 is an illustration depicting the movement of the tines relative to the travel of a tray along the forward segment of the elliptical chain-guiding track;

FIG. 11 illustrates the inclination of a tine during the aforesaid movement of a tray.

DETAILED DESCRIPTION OF THE PREFERRED EMBODIMENT

Figure 1:
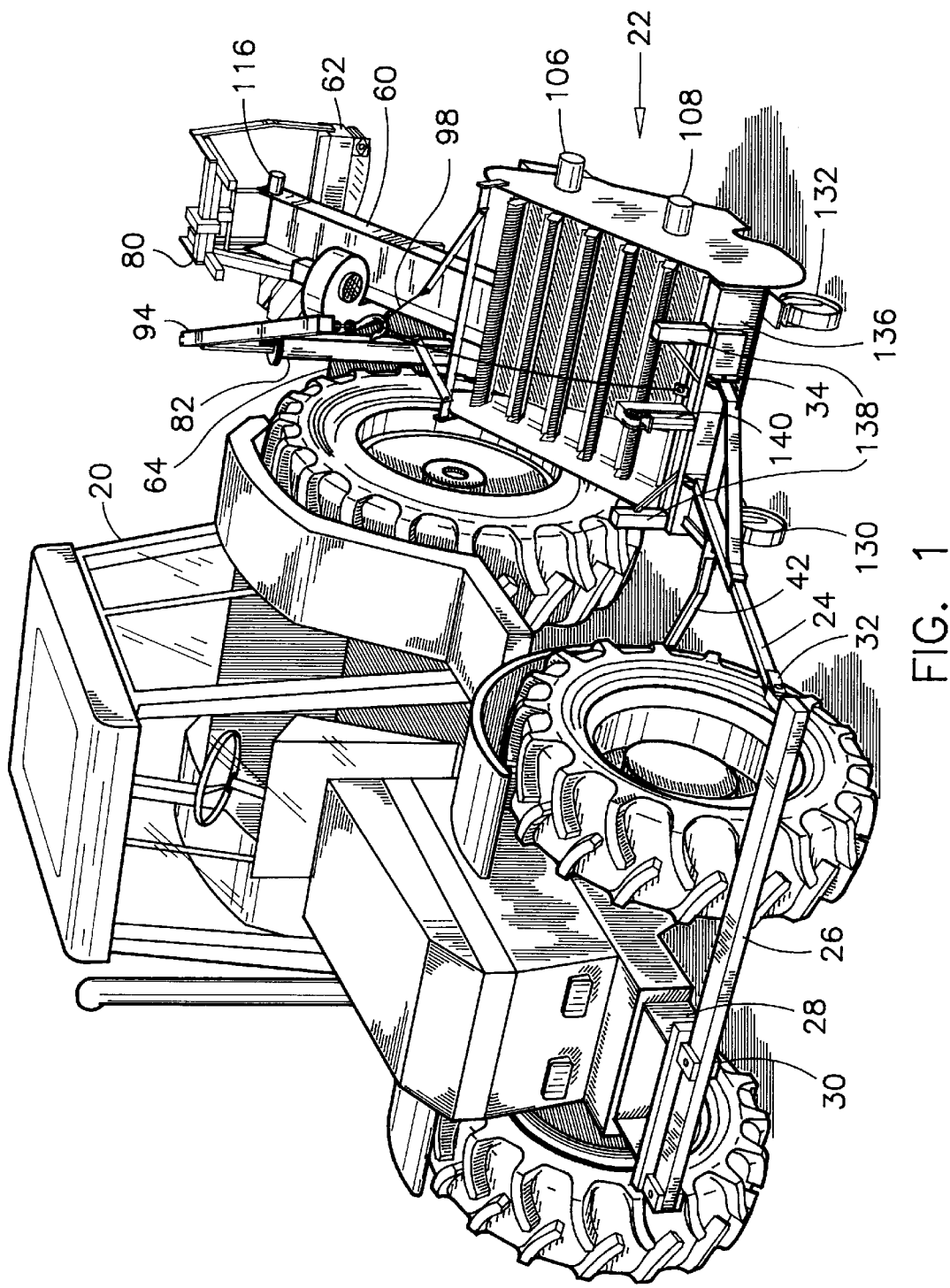
FIG. 1 is a perspective front, left side and top view of the apparatus of the preferred embodiment mounted on an agricultural tractor. The left side is determined when facing the direction of travel.
Figure 2:
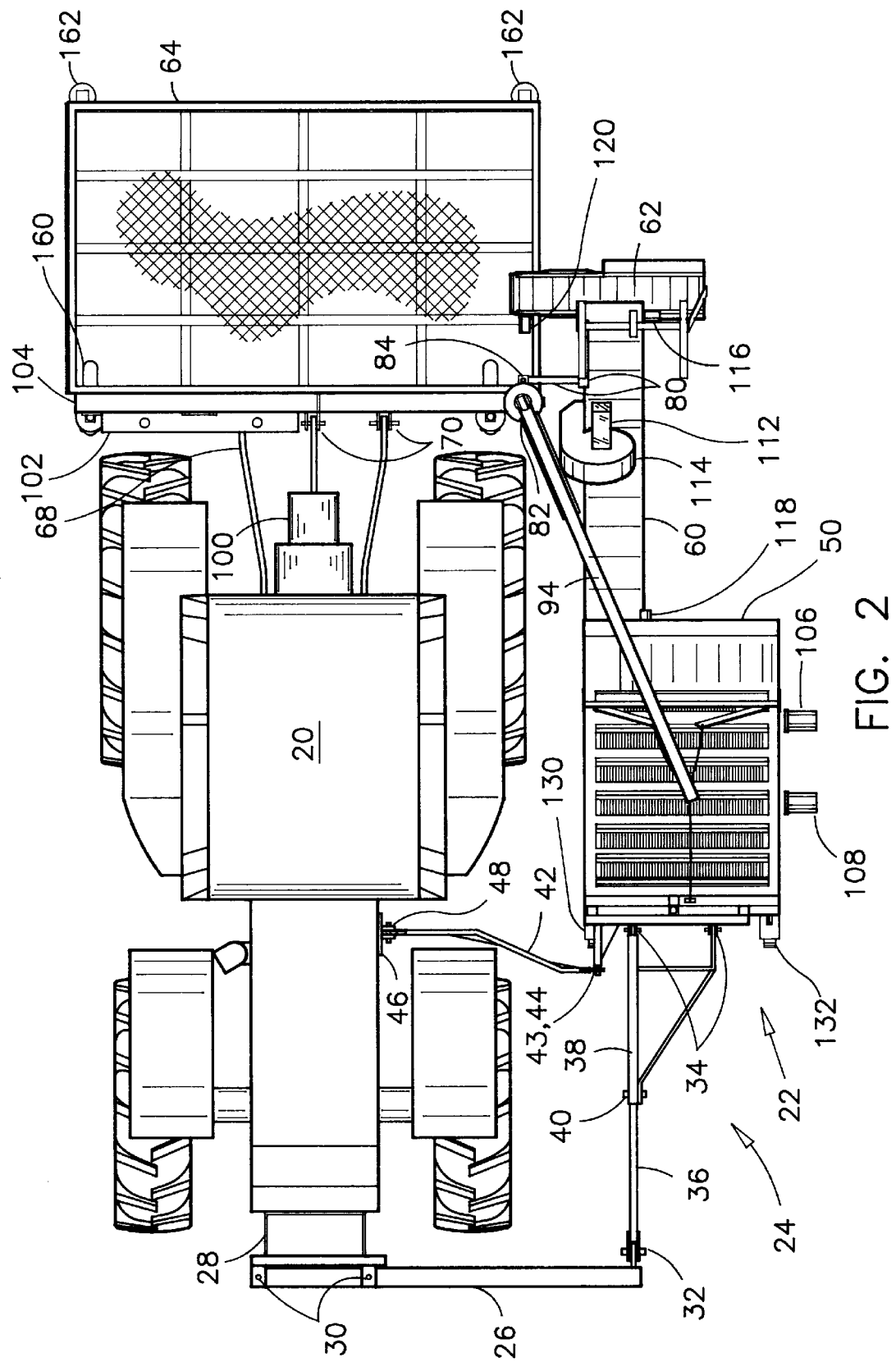
FIG. 2 is a top view of the apparatus of the preferred embodiment and of an agricultural tractor carrying the apparatus. The apparatus of the preferred embodiment is shown in a deployed operational mode.

A first aspect of the blueberry harvester of the preferred embodiment is that the components thereof are easily handled from a blueberry harvesting configuration to a roadworthy configuration. In the first configuration, the elements are deployed in a functionally serial arrangement relative to one another and in the second configuration, the elements are stowed behind the mover of the blueberry harvester for allowing safe travelling on public roads, and for using minimum space during storage of the machine. This first aspect of the blueberry harvester of the preferred embodiment is explained hereinbelow with reference to the accompanying illustrations in FIGS. 1 to 5.

The blueberry harvester of the preferred embodiment is mountable on a farm tractor 20. A blueberry picking head 22 is retained to the tractor 20 by means of a pull shaft 24 connected to a draw bar 26 which is mounted on the front end of the tractor 20. The draw bar 26 is mounted on a first anchor plate 28 on the front end of the tractor 20, by means of two pairs of first clevis and pin joints 30. The pull shaft 24 is connected between the draw bar 26 and the front end of the picking head 22 by means of a second clevis and pin joint 32, and a pair of third clevis and pin joints 34 respectively.

The pull shaft 24 comprises a first stem 36 which is telescopically mounted in a hollow tubular member 38 and is adjustably locked into the hollow tubular member 38 by a pin 40. Hence, the pull shaft 24 is adjustable in length to accommodate various sizes of tractors.

During an operation of the blueberry harvester, the picking head 22 is held at a distance from the tractor 20 by means of a span bar 42 mounted between the tractor 20 and a stem 43 and spherical bearing 44 connection on a front end of the picking head 22. The span bar 42 is connected to a second anchor plate 46 on the side of the tractor 20, by means of a fourth clevis and pin joint 48.

The blueberry harvester of the preferred embodiment also comprises a first transfer conveyor 50, an inclined conveyor 60 and a second transfer conveyor 62. The first transfer conveyor 50 receives the berries from the picking head 22, and unloads the fruits into the incline conveyor 60. The incline conveyor 60 carries the fruits into the second transfer conveyor 62.

The blueberry harvester of the preferred embodiment further has a platform 64 on which an operator can stand for manipulating containers under the discharge end of the second transfer conveyor 62, and for stacking a number of containers full of blueberries. The platform 64 is mounted of the three-point hitch 68 of the tractor by means of a fifth set of clevis and pin joints 70. The maximum width of the platform 64 is preferably no much more than the width of the tractor, such that the tractor 20 with a platform 64 attached thereto is able to drive on public roads without special permit.

Figure 3:
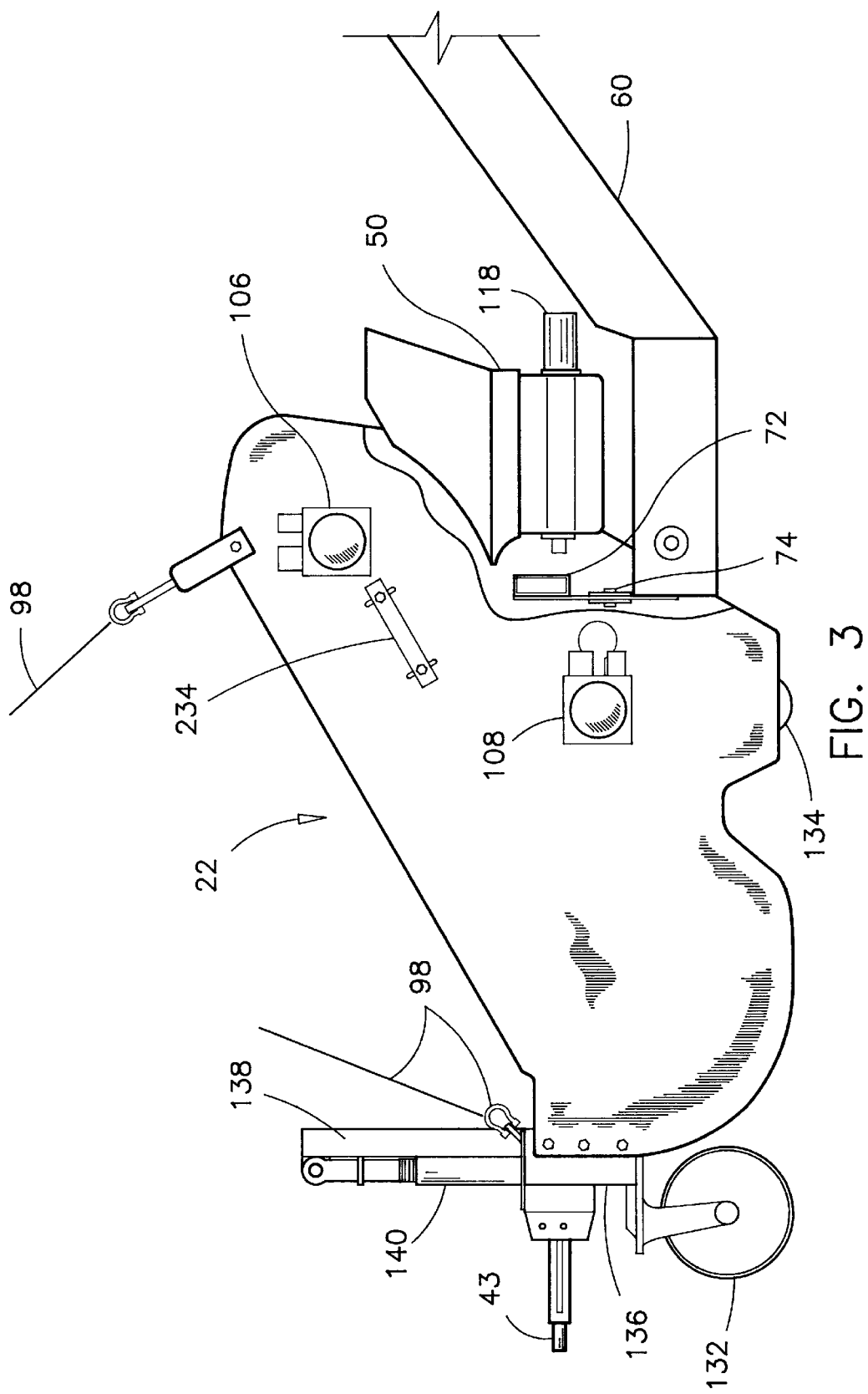
FIG. 3 is a left side view of a blueberry picking head of the preferred embodiment.

The forward end of the inclined conveyor 60 is connected to a cross member 72 extending between the sidewalls of the picking head 22. This connection comprises a clevis and pin connection 74 as illustrated in FIG. 3.

The upper end of the inclined conveyor 60 is supported on a hinged frame 80 which is connected to an upright member 82 on a corner of the platform 64. The hinged frame 80 is pivotally movable about hinge 84 (FIG. 2) along the upright member 82. A pair of arms 86 on the hinged frame 80 supports the second transfer conveyor 62. The second transfer conveyor 62 and the support arms 86 are pivotally movable about pivot 88 in a direction as indicated by arrow 90 in FIG. 4, from an operating position under the upper end of the inclined conveyor 60 to an upper inactive position above the hinged frame 80, as indicated by numerals 62', 86' and 120.

The upright member 82 also carries a jib crane 94 on its upper extremity for lifting and manipulating the picking head 22 from an operating position to a stowed position as will be explained later. The jib crane 94 is also used for supporting hydraulic hoses (not shown) supplying power to the picking head 22. The jib crane boom 94 is articulated up and down by a hydraulic cylinder 96 and is free to rotate about the vertical axis of the upright member 82. The picking head 22 is loosely retained to the crane boom 94 by chains and shackles 98 or similar rigging means.

The blueberry harvester of the preferred embodiment is operated by hydraulic power from the tractor 20. An hydraulic pump 100 is preferably mounted directly on the power-take-off shaft of the tractor. An hydraulic oil reservoir 102 is incorporated in the front framing member 104 of the platform 64. The hydraulic circuits are preferably controlled by solenoid operated valves (not shown) also mounted on the front framing member 104. In the blueberry harvester of the preferred embodiment, the valves are remotely operated from the tractor's cab.

Several hydraulic motors are used to operate the elements of the blueberry harvester. Motor 106 operates the trays of the picking head 22. Motor 108 operates a rotary brush for cleaning the trays of the picking head 22. Motor 112 operates a fan 114 for cleaning the harvested fruits moving on the inclined conveyor 60. Motor 116 operates the inclined conveyor 60. Motor 118 operates the first transfer conveyor 50 and motor 120 operates the second transfer conveyor 62.

During an operation of the blueberry harvester of the preferred embodiment, the picking head is supported on the ground by a pair of casters 130, 132 and by a cylindrical roller 134 extending over the full width of the picking head 22, near the rear end of the picking head 22. Both casters are mounted on a transversal beam 136 as illustrated in FIGS. 1 and 3. The transversal beam 136 is guided in up and down directions into a pair of slide assemblies 138 and is articulated in up and down directions by an hydraulic cylinder 140. The hydraulic cylinder 140 is actuated for raising or lowering the front end of the picking head 22 according to the height of the plants or to the irregularities of the ground to be harvested.

The platform 64 of the blueberry harvester of the preferred embodiment has a pair of wheels 160 under the front framing member 104, and a pair of telescopic supports 162 under the rear edge thereof. The platform 64 may also have one or more guard rails 164 along its perimeter for securing the work area defined by it.

During operation of the blueberry harvester of the preferred embodiment, the platform 64 may be lowered so that its weight is supported on the wheels 160. This feature is particularly convenient for harvesting blueberries with a relatively small tractor, where a continuous weight of the platform with an operating load resting thereon being supported by the three-point hitch would normally tend to cause an excessive floating of the tractor's front end.

It will be appreciated that the wheels 160 are further useful for supporting the platform 64 in storage. In that condition, the telescopic support legs 162 are adjusted downward to support the rear end of the platform 64 before the three-point hitch is uncoupled from the front framing member 104.

Figure 4:
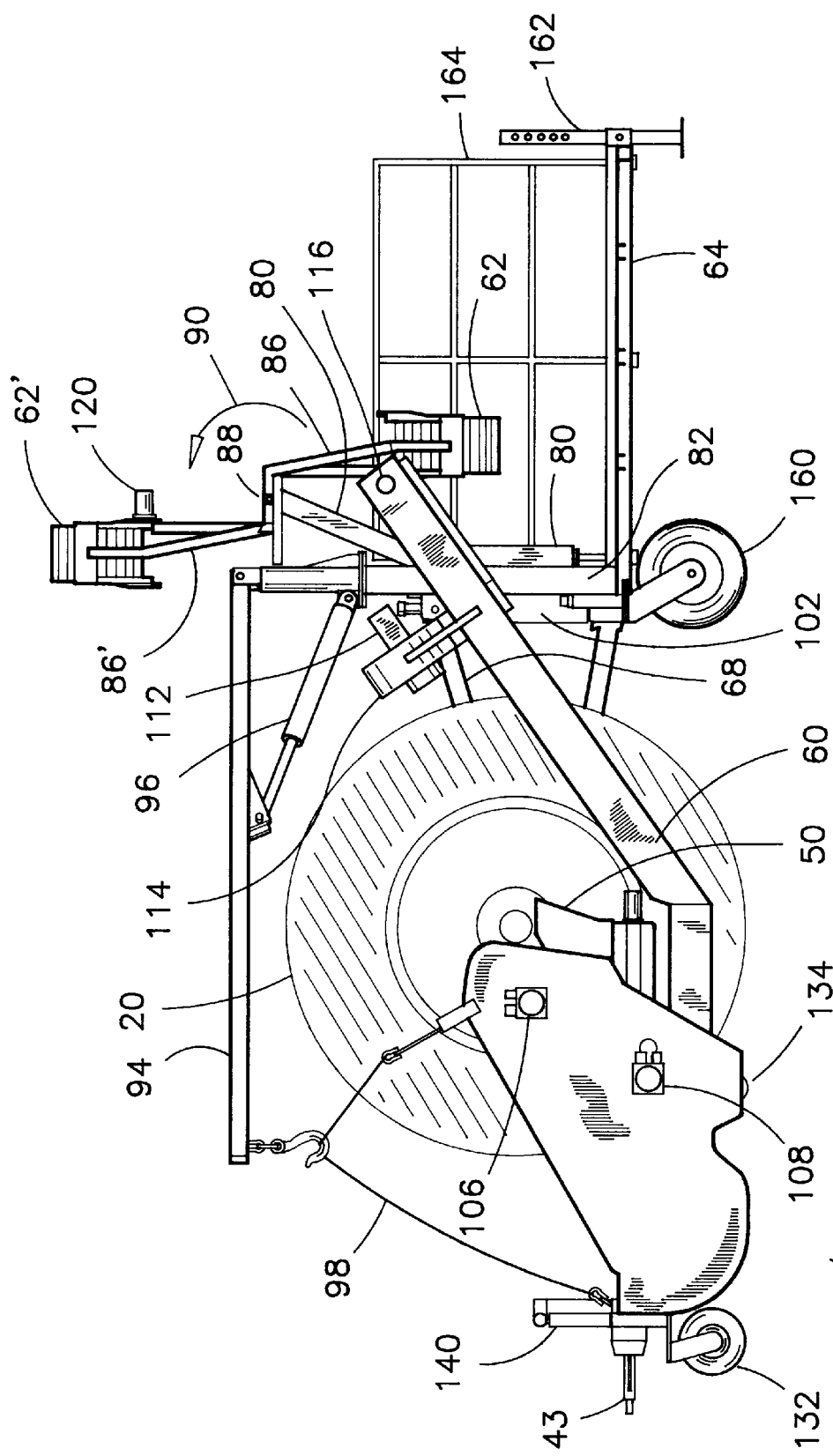
FIG. 4 is a left elevation view of the entire apparatus of the preferred embodiment.
Figure 5:
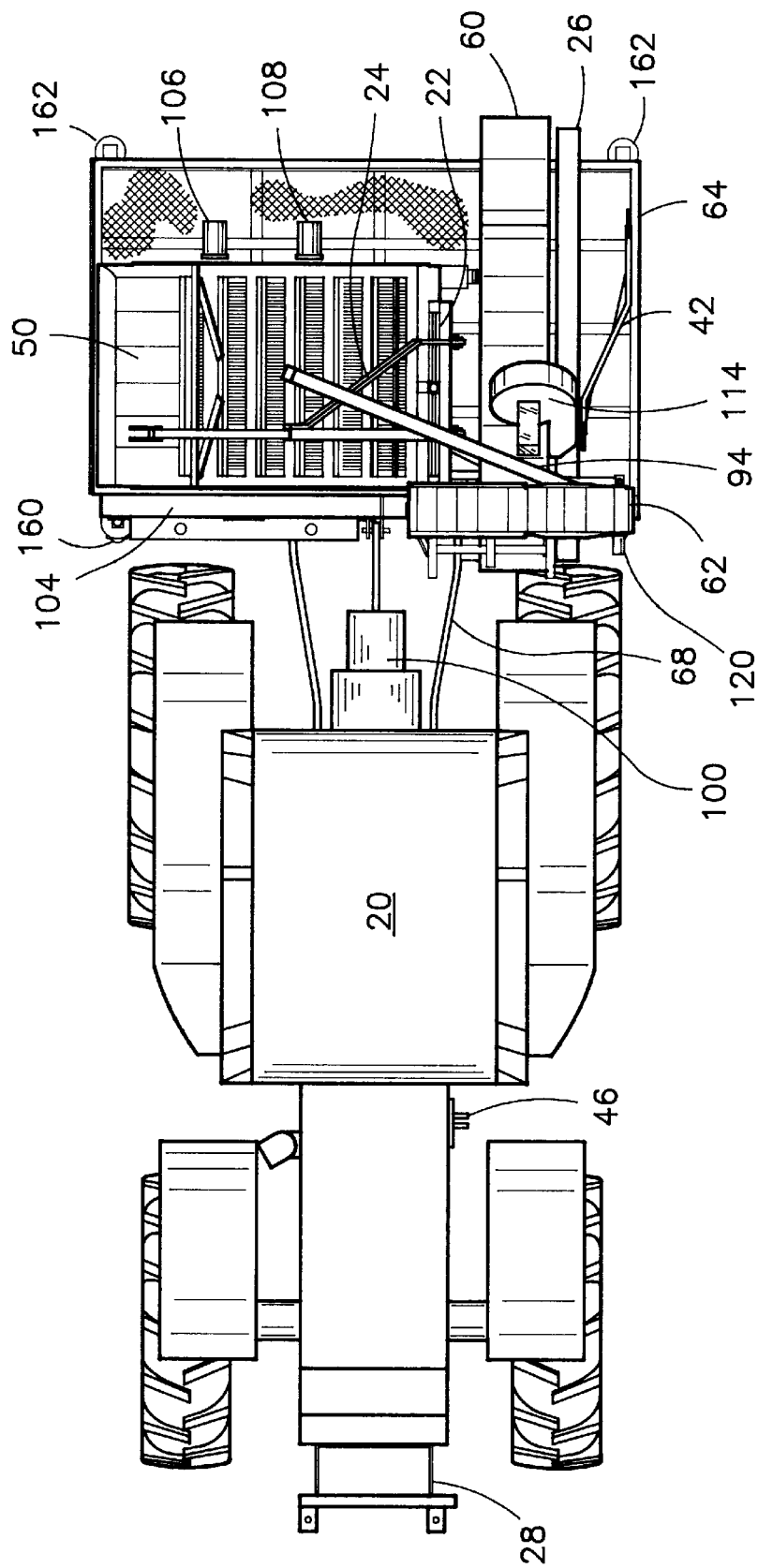
FIG. 5 is a top view of the apparatus of the preferred embodiment and of an agricultural tractor, with the apparatus of the preferred embodiment shown in a roadworthy mode wherein the components thereof are stowed on a platform behind the tractor.

As mentioned earlier, when the blueberry harvester of the preferred embodiment is not used for harvesting blueberries, the elements of the machine are stowable in a compact configuration on the platform 64. The preferred sequence for moving the elements of the harvester onto the platform 64 is as follows:

a) Uncoupling the inclined conveyor 60 from the picking head 22 by separating the clevis and pin connection 74 as shown in FIG. 3.

b) Tilting the second transfer conveyor 62 over the top of the hinged frame 80 in the direction of arrow 90 as shown in FIG. 4.

c) Turning the hinged frame 80 with the inclined conveyor 60 supported therein over an angle of 180°, over the platform 64, and locking the hinged frame 80 in this position by means of a locking pin (not shown). In this position, the lower end of the inclined conveyor 60 is resting on the rear edge of the platform 64, and extends slightly beyond the rear edge of the platform as shown in FIG. 5.

d) Uncoupling the picking head 22 from the draw bar 26 and from the spanner bar 42 by undoing the clevis and pin joint 32 and the pin and spherical bearing connection 43,44. Tilting the draw shaft 24 upwardly about connections 34 until the draw shaft rests substantially over an upper side of the picking head 22.

e) Raising the picking head 22 above the ground with the jib crane 94 and rigging 98, and swinging it over the platform 64 to a location alongside the inclined conveyor 60, as illustrated in FIG. 5.

f) Detaching the draw bar 26 from the clevis and pin connections 30. Detaching the spanner bar 42 from the clevis and pin connection 48. Placing the draw bar 26 and the spanner bar 42 on the platform 64 alongside the inclined conveyor 60.

When the elements of the blueberry harvester of the preferred embodiment are arranged in this configuration, a tractor having the blueberry harvester mounted thereon can safely travel over public roads. This feature is further appreciable for easily stowing the harvester away during periods of inactivity. The deployment or stowing of the elements of the blueberry harvester of the preferred embodiment is effected quickly by manipulating quickpin connections. The task does not require bolting, unbolting or adjustment of any kind. Users of this harvester can safely travel great distances between fields of blueberries and swiftly resume a harvesting mode.

Figure 8:
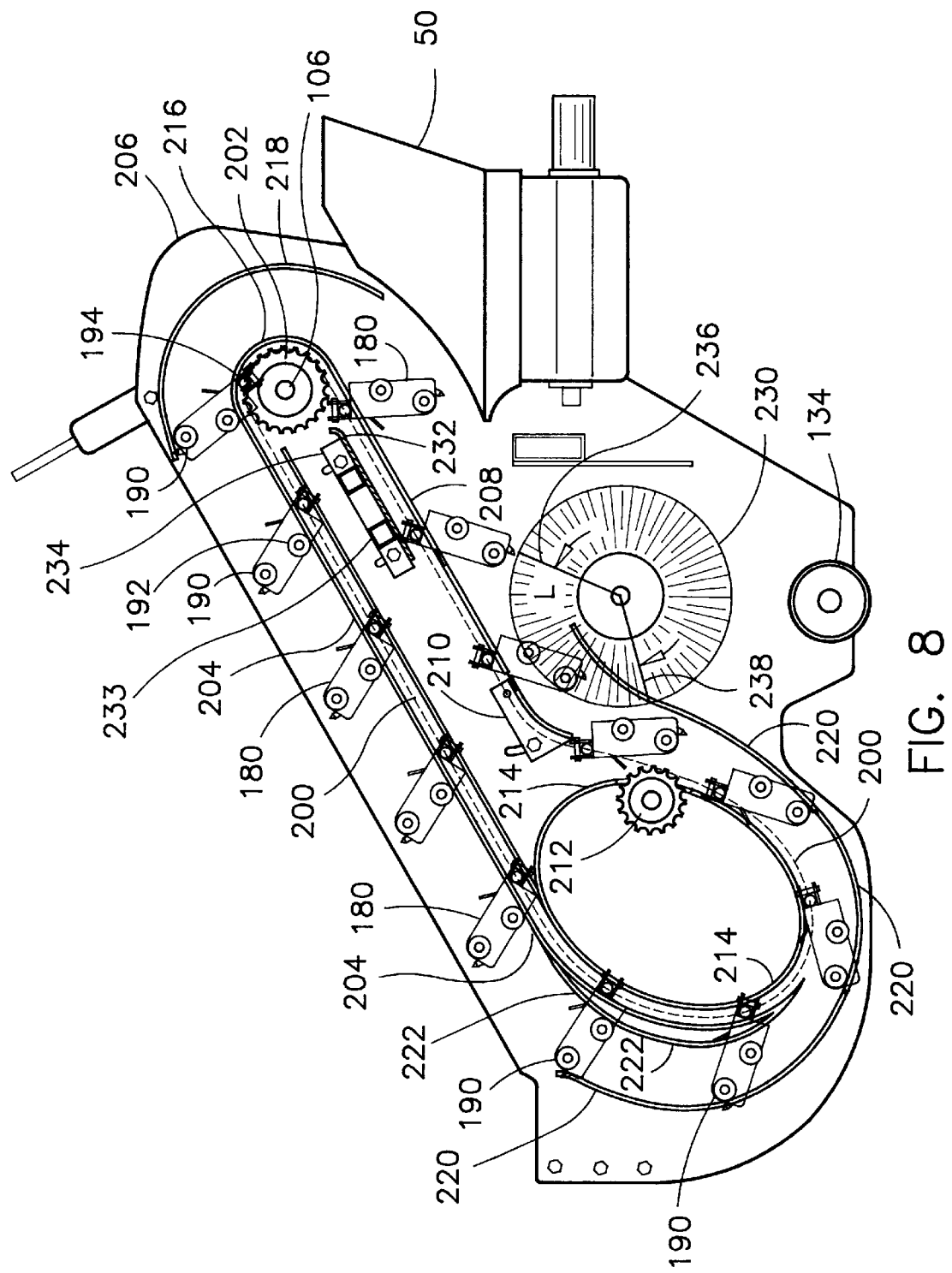
FIG. 8 is an internal view of the blueberry picking head with the left side plate removed.

Referring now to FIGS. 6 and 7, there is illustrated therein one of several trays 180 movably mounted inside the picking head 22. Each tray comprises a back member 182 extending widthwise relative to the picking head 22, and a series of tines 184 extending forwardly from the back member 182. Each tray also comprises two side plates 186 attached to the ends of the back member 182. The side plates 186 form with the tines 184 and the back member 182, a receptacle for receiving harvested fruits. The tray 180 of the preferred embodiment also has a deflector strip 188 extending above the backing member 182 for increasing the volume of the receptacle for receiving harvested fruits. Each side plates 186 has a pair of rollers extending laterally from the tray 180. The pair of rollers comprises a front roller 190 and a rear roller 192. The respective function of these rollers will be explained later when making reference particularly to FIGS. 8 and 9.

Each tray 180 is supported on a pair of roller chains (not shown), one at each end of the tray. Each tray 180 is mounted on a round bar 194, shown in dotted lines in FIG. 7, spanning across the pair of roller chains. The tray 180 is affixed to the round bar 194 by a pair of C-clamp 196, one at each end of the tray 180, and a bolt 198 through each C-clamp 196. The advantage of this mounting arrangement is that the trays 180 are easily removable for replacement or for doing maintenance work on the picking head 22. As will be appreciated from the illustration of FIG. 8, a large portion of the trays 180 can be removed through the front side of the picking head 22 without moving the roller chains.

Referring now particularly to FIGS. 8 to 11, there is illustrated therein a cross-section of the picking head 22 showing the path of the roller chain 200 and the movement of the trays 180 inside the picking head 22. The roller chains 200, shown in dotted lines is preferably a conveyor type chain having extended-pitch links and carrier rollers. Each roller chain 200 is driven by sprocket 202 connected to the output shaft of hydraulic motor 106. The chain 200 is guided along a closed chain-guiding circuit by guide channels and curved strips. A first channel 204 mounted on the side plate 206 of the picking head 22 defines an upward slope. A second channel 208 defines a downward slope. A first curved strip 210 is adjustably movable relative to the side plate 206 and provides a chain tightener means. The chain 200 is guided around a lower portion of its path on a second sprocket 212 and on an oval-shaped chain-guiding track 214.

Each tray 180 is further guided along the path of the chain 200 by several curved strips. During the upward movement of each tray 180 the rear roller 192 thereof rolls over the upper side of channel 204, and over a second curved strip 216 encircling the drive sprocket 202. The dumping movement of the tray occurs when the tray 180 swings over the drive sprocket 202. This movement is further guided by a third curved strip 218. The strip 218 applies a restrictive force of the front roller 190 of the tray, for preventing the tray 180 from pivoting about the mounting bar 194 until the bar 194 is in a lower quadrant of sprocket 202.

A fourth curved strip 220 guides the front roller 190 of each tray 180 along a lower region of the picking head 22. A transitional curved strip 222 along a forward region of the oval-shaped chain-guiding rail 214 prevents each tray 180 from tilting downwardly when an alignment of bar 194 and front roller 190 on each tray is substantially perpendicular to the surface of the fourth curved strip 220. In this instance, approximately when the roller 190 leaves the fourth curved strip 220, the weight of the tray 180 is transferred on roller 192 and on the transitional curved strip 222.

Referring now to FIGS. 9, 10 and 11, there are illustrated therein the movements of the trays 180, and especially the tines 184, during the harvesting portion of the tray's cycle through the picking head 22. The movements defined in the following disclosure pertain to a picking head being in a stand still mode. One will understand that those movements are nonetheless distinct and advantageous when the blueberry harvester of the preferred embodiment is moving at a harvesting speed.

The movement of the tines entering a plant is defined as being from where the tip of a tine 184 is at a lowermost point, that is when bar 194 is at position A, to a lowermost position of bar 194 at position B. The corresponding orientations of the tines are defined as being orientation A' and orientation B' in FIGS. 10 and 11. The movement of the tines for stripping berries from the plants is defined as being from a lowermost position of bar 194, at point B, to a foremost position of bar 194 at point C. The corresponding orientations of tines 184 is illustrated in FIGS. 10 and 11 labeled as B' and C' respectively.

The horizontal displacement of a tine during the plant entering phase, as shown by label D is similar to the movement of the tine during the fruit stripping phase as shown by label E (4.87 and 4.39 inches respectively). The total horizontal travel of a tine during both movements is about twice as much as the length of one tine as shown by label F. For reference purposes, the length of one tine is about 4.75 inches.

The vertical displacement G of a tine during the plant entering phase is relatively short as compared to the displacement H during the plant stripping phase. In fact, the distance G is approximately one quarter of the distance H (2.0 and 7.6 inches respectively). Therefore, during the harvesting portion of the tray's cycle, the tines enter the plant quickly under the lower branches of the plants while effecting minimum vertical movement. Then the vertical speed of the tines is significantly increased as compared to the horizontal movement, for stripping the berries from the plant without wedging these fruits against the back member 182 of each tray 180.

The angular movement of the tines during the plant entering phase, as shown by label J is about 32° while the angular movement of the tines during the fruit stripping phase, as shown by label K is only about 20°. For the same reasons as explained above, the tines are quickly positioned to a horizontal orientation under the plants during the plant entering phase, and a minimum angular displacement is effected during the fruit stripping phase.

The aforesaid controlling of the horizontal, vertical and angular displacements of the tines during the harvesting portion of the tray's cycle produces a motion which is similar to the movement of an experienced blueberry picker manipulating a manual blueberry picking implement. This motion produces minimum damage to the fruits and to the plants.

In the preferred embodiment, the eliptical chain-guiding track 214 has a major diameter 224 of about sixteen inches, a minor diameter 226 of about twelve inches and an inclination I of the major axis from a horizontal line 228 of about 60°. It will be appreciated that the dimensions of the oval-shaped chain-guiding rail 214 and guiding strip 220 may be oriented otherwise to accommodate the harvesting of other fruit bushes.

Referring back to FIG. 8, there is illustrated therein a third aspect of the blueberry harvester of the preferred embodiment. The tines 184 of each tray 180 are cleaned during their descending movement along the second channel 208, by a rotary brush 230. Such cleaning is effected for removing twigs, leaves and other similar debris from between the tines and from inside the trays.

A deflector shoe 232 is mounted along the centerline of the picking head by means of a pair of tubular members 233 extending between both sides of the picking head and being adjustably affixed to the side plates of the picking head above the second channel 208 by a pair of brackets 234, one on each side plate of the picking head. The deflector shoe 232 is positioned along the centerline of the picking head for engaging with the tab 235 of each tray 180, as illustrated in FIG. 6 for tilting each tray forwardly before it enters into the rotary brush 230.

The rotary brush 230 is positioned near a lower region of the second channel 208, where the chain 200 is diverted over the eliptical chain-guiding track 214. An advantage of such positioning of the rotary brush is that each tray 180 travels through a large portion of the brush 230. In the preferred embodiment, each tray 180 makes contact with the rotary brush 230 from about at line 236, to about at line 238. The angle L between lines 236 and 238 is approximately 130°. Such a large contact area on the rotary brush 230 ensures that each tray 180 is efficiently cleaned before moving to a plant entering position.

While the above description provides a full and complete disclosure of the preferred embodiment of this invention, various modifications, alternate constructions and equivalents may be employed without departing from the true spirit and scope of the invention. Such changes might involve alternate materials, components, structural arrangements, sizes, operational features or the like. Therefore the above description and accompanying illustrations should not be construed as limiting the scope of the invention which is defined by the appended claims.

We claim:

1. A blueberry harvester comprising:
   a work platform mountable behind a farm tractor, said work platform having a front edge, a rear edge, a harvesting side, a harvested side, a nominal width and a nominal surface area; said front edge having a front framing member extending longitudinally and upwardly therefrom, said front framing member having a post near said harvesting side and a jib-boom crane mounted on said post;
   a picking head having means for withdrawing blueberries from blueberry plants and rigging means extending to said jib-boom crane;
   conveyor means for conveying said blueberries withdrawn from said plants, from said picking head to a region over said platform; and
   a hinged frame pivotally mounted on said post, said hinged frame being connected to said conveyor means for supporting said conveyor means;
   said conveyor means and said picking head having a combined ground projection which is smaller than said nominal surface area of said platform;
   said hinged frame with said conveyor means supported thereon being movable over an angular displacement of about 180°, from a harvesting position alongside said harvesting side, to a stowed position over said platform near said harvesting side;
   said jib-boom crane being movable with said picking head suspended thereto from a first position along said harvesting side, to a space over said platform between said stowed position of said conveyor means and said harvested side;
   whereby said picking head and said conveyor means are stowable side by side on said platform during nonharvesting periods.

2. A blueberry harvester as claimed in claim 1 wherein said platform comprises a pair of wheels mounted under said front edge thereof.

3. A blueberry harvester as claimed in claim 2, wherein said platform further comprises a pair of telescoping support legs mounted under said rear edge thereof.

4. A blueberry harvester as claimed in claim 1, wherein said front framing member of said platform comprises a first set of clevis and pin connections for attaching said platform to a three-point hitch of an agricultural tractor.

5. A blueberry harvester as claimed in claim 4 wherein said nominal width of said platform is a roadworthy width.

6. A blueberry harvester as claimed in claim 1 further comprising a spanner bar and draw bar both being attachable between an agricultural tractor and said picking head by means of a first and second set of clevis and pins connections respectively, for aligning and pulling said picking head by and alongside said agricultural tractor.

7. A blueberry harvester as claimed in claim 6 wherein said conveyor means is retainable to said picking head by means of a third set clevis and pin connections.

8. A blueberry harvester as claimed in claim 1 further comprising hydraulic power supply and actuator means for operating said picking head and said conveyor means.

9. A blueberry harvester as claimed in claim 8 wherein said front framing member comprises an hydraulic oil reservoir incorporated therein.

10. A blueberry harvester as claimed in claim 8 wherein said picking head comprises hydraulically supported wheels for adjustably supporting said picking head above the ground.

11. A blueberry picking head for harvesting blueberries, comprising:
    a framing means having a forward low end, a rear high end, a pair of spaced apart side plates each having an inside side; said framing means being movable over a crop in a direction before said forward low end;
    a pair of chain-guiding circuits each being mounted on a respective said inside side of each said side plates; and each of said chain-guiding circuits comprising a forward segment, an uprising segment connected to said forward segment, a return segment, a first transitional segment connected to said uprising segment and to said return segment and a second transitional segment connected to said return segment and to said forward segment;
    a pair of roller chains movably mounted in said chain-guiding circuits;
    a first drive means connected to said pair of roller chains for moving said roller chains along said chain-guiding circuit; and
    a plurality of elongated blueberry picking trays mounted between and attached to said roller chains at regular intervals there-along and aligned perpendicularly to a direction of travel of said framing means;
    each said forward segments having means for moving said trays along a plant entering motion and a plant stripping motion wherein a horizontal component of said plant entering motion is greater than a vertical component of said plant entering motion, and wherein a vertical component of said plant stripping motion is greater than a horizontal component of said plant stripping motion.

12. A blueberry picking head as claimed in claim 11 wherein said forward segment comprises means for moving said tray along a path wherein an angular displacement of said tines during said plant entering motion is about thirty-two degrees (32°), and an angular displacement of said tines during said plant stripping motion is about twenty degrees (20°).

13. A blueberry picking head as claimed in claim 11 wherein said forward segment comprises means for moving said tray along a path wherein said first vertical component of said plant entering motion is about four times smaller than said second vertical component of said plant stripping motion.

14. A blueberry picking head as claimed in claim 11 wherein said forward segment is elliptical in shape and has a major diameter of about sixteen inches (16") and a minor diameter of about twelve inches (12").

15. A blueberry picking head as claimed in claim 14 wherein said major diameter is oriented at sixty degrees (60°) with a horizontal plane.

16. A blueberry picking head as claimed in claim 11, further comprising a rotary brush mounted near said second intermediate segment of said chain-guiding circuit for cleaning said tines before each said tray starts said plant entering motion.

17. A blueberry picking head as claimed in claim 11 further comprising a plurality of elongated round bars affixed at regular intervals between said roller chains, and each said tray comprises C-clamp means for engagement with a respective said round bar.

18. A blueberry picking head for harvesting blueberries on blueberry plants, comprising:

a framing means having a forward low end, a rear high end, a pair of spaced apart side plates each having an inside side; said framing means being movable over a crop in a direction before said forward low end;

a pair of chain-guiding circuits each being mounted on a respective said inside side of each said side plates; and each of said chain-guiding circuits comprising a forward segment, an uprising segment connected to said forward segment, a return segment, a first transitional segment connected to said uprising segment and to said return segment and a second transitional segment connected to said return segment and to said forward segment;

a pair of roller chains movably mounted in said chain-guiding circuits;

a first drive means connected to said pair of roller chains for moving said roller chains along said chain-guiding circuit;

a plurality of elongated blueberry picking trays mounted between and attached to said roller chains at regular intervals there-along and aligned perpendicularly to a direction of travel of said framing means; and a rotary brush mounted along said second intermediate segment of said chain-guiding circuit for cleaning said tines before said trays move over said forward segment;

said return segment, said second intermediate segment and said forward segment defining jointly an arc wherein each tray contacts about one hundred and thirty degrees (130°) around said rotary brush, such that said tines are thoroughly cleaned by said rotary brush.

19. A blueberry picking head as claimed in claim 18, further comprising tray tilting means for tilting each said trays forwardly relative to a movement of said trays along said return segment before each said tray contacts said rotary brush.

20. A blueberry picking head as claimed in claim 18 wherein said second intermediate segment comprises means for tightening said roller chains.

* * * * *

UNITED STATES PATENT AND TRADEMARK OFFICE
CERTIFICATE OF CORRECTION

PATENT NO. : 6,000,203
DATED : December 14, 1999
INVENTOR(S) : Lloyd H. Weatherbee, Brian Weatherbee It is certified that error appears in the above-identified patent and that said Letters Patent is hereby corrected as shown below:

On the title page, item [76],

The word "Madison" should read "Mason"

Signed and Sealed this

Twentieth Day of June, 2000

*Attest:*

Q. TODD DICKINSON

*Attesting Officer*    *Director of Patents and Trademarks*